March 18, 1969  R. THEES  3,433,987
ROTOR WITHOUT STICKING MOMENT
Filed July 29, 1965

INVENTOR.
RICHARD THEES
BY
AGENT

United States Patent Office 3,433,987
Patented Mar. 18, 1969

3,433,987
ROTOR WITHOUT STICKING MOMENT
Richard Thees, Aachen, Germany, assignor to North American Philips Company, Inc., New York, N.Y., a corporation of Delaware
Filed July 29, 1965, Ser. No. 475,750
U.S. Cl. 310—156
Int. Cl. H02k 21/12, 21/00
20 Claims

ABSTRACT OF THE DISCLOSURE

A synchronous motor that includes a stator having a pair of spaced poles and a permanent magnet rotor divided axially into first and second contiguous cylindrical segments that are transversely magnetized at an angle of 90 degrees relative to one another. An auxiliary magnet that is offset relative to the field axis of the stator pole pair coacts with the rotor to insure that the motor is self-starting.

---

This invention relate to synchronous motors and more particularly to self-starting permanent magnet synchronous motors. Motors of this type comprise a stator and a permanent magnetic rotor, each having at least one pair of poles. Such motors have a torque, even when the stator coil is not energized, so that the rotor is moved into a position in which the total magnetic flux in the air gap is at a maximum. In general, this torque, which will be termed hereinafter the sticking torque, is not desired.

When the stator coil is not energized, the magnetic rotor assumes a rest position relative to the stator such, that its induction is parallel to that of the stator field when present. As a result, no torque is exerted thereon when the coil is energized. By utilizing a non-symmetrical shape of the stator it can be ensured that the rest position is shifted over a small angle of, for example, 4 electrical degrees. Although a better start is obtained when said angle is larger, which means when no sticking force prevails, a further device produces such a directional moment that in the rest position the induction of the magnetic rotor is at right angles so that of the stator field.

Moreover, the sticking torque is superimposed, at synchronous speed, on the electric torque $M_{el}$ produced by the stator coils and the rotor field. In this way, the average power produced is not varied, it is true, but non-uniform variation of the torque over one revolution occurs.

In accordance with the invention, the undesirable sticking torque can be reduced if the rotor is divided axially into at least two portions having poles that are relatively displaced over 90 electrical degrees.

In a further embodiment of the invention, it is even possible to overcome the sticking torque if the rotor is divided into two portions of equal length and in an axial direction the rotor is arranged symmetrically with respect to the stator.

In a further development of the invention, the rotor is divided into three portions, the central portion having a length equal to half the height of the co-operating stator plates, whereas the two identical outer portions have a length equal to at least one quarter of the rotor length. The induction of the first-mentioned portion with respect to the induction of the two further portions is at an angle of preferably 90 electrical degrees. Also in this case the rotor is arranged symmetrically to the stator in an axial direction. By this arrangement periodic displacement of the rotor in an axial direction, as far as the axial play would permit such a displacement, or a periodic pressure on the bearings in an axial direction, is avoided.

By arranging the portions of the rotor magnet at an angle of 90 electrical degrees the resultant magnetic flux is reduced by a factor $\sqrt{2}$. The effective magnet face of the rotor, i.e. the magnetic flux or the number of turns of the stator coil and hence the voltage induced by the magnetic flux are enhanced by a factor $\sqrt{2}$, so that a motor having the same electrical torque as that of a motor having a non-divided rotor is obtained, but without sticking torque. However, such a motor is not suitable for self-starting since the rest position of the rotor is not unambiguously determined. For the self-start the rotor must have, in the rest position, an induction, the direction of which is at an angle of at least 5 electrical degrees, preferably 90 electrical degrees to the direction of the coil field of one pole pair of the stator. According to a further aspect of the invention, this can be achieved by arranging at least one auxiliary magnet so that in the stable rest positions provided the stator coil(s) are not energized, the magnetic induction of each pole pair of the rotor is at an angle at least 5° electrical, preferably 90° electrical to the direction of the coil field of a pole pair of the stator. The rotor projects in an axial direction on either side for a given distance beyond the stator, and at least one auxiliary magnet is provided on the periphery of at least one of the projecting rotor portions.

This may also be achieved, in accordance with a further aspect of the invention, by arranging an auxiliary magnet on the rotor shaft at a point beyond the stator, said magnet being surrounded by a stationary iron yoke so that, when the coil is not energized, the rotor has at least two stable rest positions in which the resultant magnetic induction of a pole pair of the rotor is at an angle of preferably 90° electrical to the direction of the magnetic field of a pole pair of the stator.

In a further development of the motor according to the invention, the auxiliary magnet is proportioned so that for a predetermined operational position of the motor the sticking torque produced by the auxiliary magnet is equal in value to that of the electrical moment and is phase shifted by about 180° with respect to the electrical moment.

If the 90° position of the induction of the rotor with respect to the stator shaft is abandoned in the rest position, and if a smaller angle is accepted, the sticking torque can be fixed in value and phase by the value of the auxiliary magnet and by turning the iron yoke, so that at a given working point of the motor, in only one direction of rotation, the sum of the sticking torque and the electrical torque is substantially constant. Such a motor thus exhibits, in synchronous operation, a torque variation in one revolution equal to that of a multiphase motor.

When the iron yoke is set in place, care must be taken that this yoke does not affect the reluctance of the stator to an inadmissible extent. The two iron circuits must therefore be adequately spaced apart from each other.

The foregoing will now be explained more fully with reference to the accompanying drawing which illustrates a few embodiments of the invention.

Figure 1:
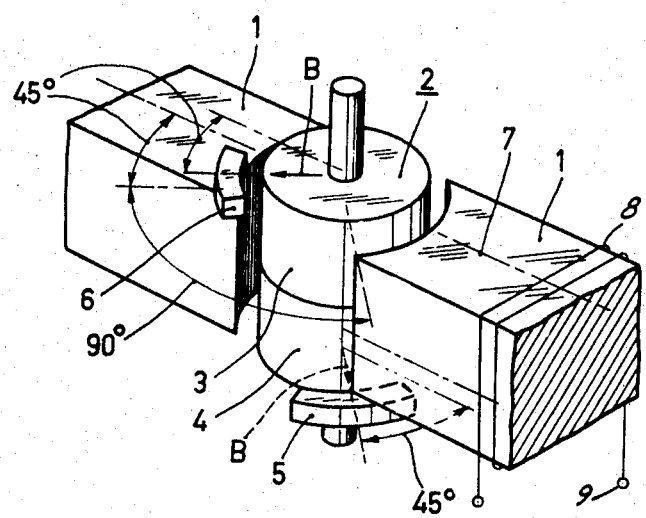
FIG. 1 shows an arrangement according to the invention having a rotor consisting of two identical portions which project symmetrically out of the stator plates and are provided with auxiliary magnets.

As shown in FIG. 1, a bipolar rotor 2 having two identical portions 3 and 4 is arranged between the stator poles 1, said portions projecting symmetrically in an axial direction from the stator plates. At the edge of the stator plates two auxiliary magnets 5 and 6 are provided. These magnets are shifted through an angle of 45° with respect to the axis 7 of the stator so that the induction of said auxiliary magnets 5 and 6 are at an angle of 90° to each other. In the rest position the rotor is thus held so that the total induction of the rotor is at an angle of 90° to the axis 7 of the stator. A stator winding 8 is wound on the stator and is connected to terminals 9 to which a source of AC current is supplied.

Figure 2:
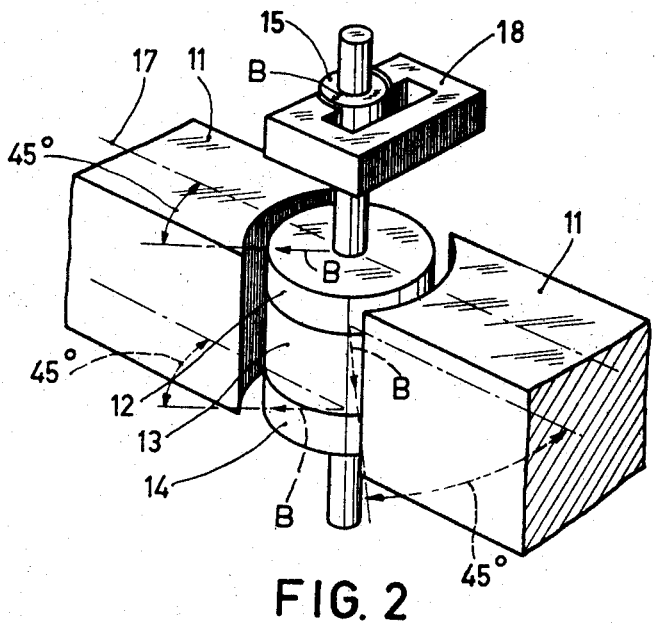
FIG. 2 shows a motor according to the invention, which comprises a rotor having three portions and which is provided with an auxiliary magnet with an iron yoke, the induction of the rotor and of the auxiliary magnet are at an angle of about 90° electrical.

FIG. 2 shows how a rotor is divided into three portions 12, 13 and 14. The central portion 13 has a length equal to half the height of the co-operating stator plates 11, whereas the two outer portions 12 and 14, which are identical to each other, are at least one quarter of the length of the rotor. The induction of the central portion 13 is at right angles to the induction of the two outer portions 12 and 14. This rotor can replace, without further means, the rotor 2 of FIG. 1, which comprises two portions. The operation of the motor is thus improved so that the periodic axial displacement of the rotor of FIG. 2 due to the axial magnetic asymmetry does not occur in this case.

Moreover, with this motor having a stator 11, provided with a rotor 12, 13, 14 with two poles, operating without sticking torque, an auxiliary magnet 15 is arranged on the shaft of the rotor 12, 13, 14. The magnet is provided with an iron yoke 18. The position of the iron yoke 18 and of the auxiliary magnet 15 is chosen so that the induction B of the rotor 12, 13, 14, in the rest position, is at an angle of 90° to the axis 17 of the stator poles.

If the 90° position of the induction of the rotor 12, 13, 14 with respect to the stator axis 17 in the rest position is abandoned, and if a smaller angle is allowed, the sticking torque may be varied both in value and in phase by the value of the auxiliary magnet 15 and turning of the iron yoke 18 so that at a given working point of the motor, only in one direction of rotation, the sum of the sticking torque and of the electrical torque is substantially constant. Consequently, at synchronous speed, such a motor has a variation of torque in one revolution equal to that of a multiphase motor.

What is claimed is:

1. A synchronous motor comprising a ferromagnetic stator having at least one pair of poles, a stator winding mounted thereon, a permanent magnetic rotor that is axially divided into at least two segments having poles that are shifted relative to each other by approximately 90 degrees, and means for applying an AC current to said stator winding that is independent of the rotor position.

2. A motor as claimed in claim 1 wherein the rotor is divided into two segments of equal length that interact magnetically with said stator pole pair and wherein in an axial direction the rotor is symmetrical relative to the stator.

3. A motor as claimed in claim 1 wherein the rotor is axially divided into three segments, the first segment being axially disposed between the second and third segments, said second and third segments being transversely magnetized at an angle of 90 degrees relative to the first segment, the length of said second and third segments being approximately equal to half the length of said first segment.

4. A motor as claimed in claim 1 further comprising at least one auxiliary magnet arranged adjacent the periphery of the rotor so that the rotor exhibits a stable rest position when the stator winding is not energized such that the magnetic induction of each rotor pole pair is at an angle of at least 5° relative to the direction of the field produced by said stator pole pair.

5. A motor as claimed in claim 1 further comprising a rotatable rotor saft that extends beyond the stator, an auxiliary magnet mounted on a portion of the shaft extending beyond the stator, a stationary iron yoke mounted adjacent said auxiliary magnet so that, when the winding is not energized, the rotor exhibits at least two stable rest positions in which the resultant magnetic induction of at least one rotor pole pair is at an angle of at least 5° relative to the direction of the magnetic field of the stator pole pair.

6. A motor as claimed in claim 1 further comprising a rotatable rotor shaft that extends beyond the stator, an auxiliary magnet mounted on a portion of the rotor shaft extending beyond the stator, an iron yoke mounted adjacent said auxiliary magnet so that the rotor exhibits two stable rest positions when the stator winding is not energized, the auxiliary magnet and the associated iron yoke being adjusted so that for a predetermined operational position of the motor the sticking moment produced by the auxiliary magnet is equal in value to the electrical motor torque and is shifted in phase approximately 180° relative to the electrical torque.

7. A motor as claimed in claim 3 further comprising at least one auxiliary magnet arranged adjacent the periphery of the rotor so that the rotor exhibits a stable rest position when the stator winding is not energized such that the magnetic induction of each rotor pole pair is at an angle of at least 5° relative to the direction of the field produced by said stator pole pair.

8. A motor as claimed in claim 3 further comprising a rotatable rotor shaft that extends beyond the stator, an auxiliary magnet mounted on a portion of the shaft extending beyond the stator, a stationary iron yoke mounted adjacent said auxiliary magnet so that, when the winding is not energized, the rotor exhibits at least two stable rest positions in which the resultant magnetic induction of at least one rotor pole pair is at an angle of at least 5° relative to the direction of the magnetic field of the stator pole pair.

9. A motor as claimed in claim 3 further comprising a rotatable rotor shaft that extends beyond the stator, an auxiliary magnet mounted on a portion of the rotor shaft extending beyond the stator, an iron yoke mounted adjacent said auxiliary magnet so that the rotor exhibits two stable rest positions when the stator winding is not energized, the auxiliary magnet and the associated iron yoke being adjusted so that for a predetermined operational position of the motor the sticking moment produced by the auxiliary magnet is equal in value to the electrical motor torque and is shifted in phase approximately 180° relative to the electrical torque.

10. A synchronous motor comprising a ferromagnetic stator having at least one pair of spaced poles, at least one stator winding mounted thereon, a permanent magnet rotor divided axially into first and second cylindrical segments that are transversely magnetized at an angle of approximately 90 degrees relative to one another, a rotatable shaft supporting said rotor for rotation between said stator poles, and means for applying an alternating current to said stator winding.

11. A motor as described in claim 10 wherein said first and second segments are equal in length and contact one another to form an integral cylindrical rotor that is axially symmetrical relative to the stator.

12. A motor as described in claim 10 further comprising an auxiliary magnet adjacent the periphery of the rotor and offset relative to the field axis of said stator poles by an angle of at least 5 degrees.

13. A motor as described in claim 12 further comprising a second auxiliary magnet adjacent the periphery of the rotor and offset relative to the first auxiliary magnet and to the field axis of said stator poles.

14. A motor as described in claim 10 wherein said rotor shaft extends outside of the stator poles, an auxiliary magnet mounted on a portion of said shaft extending outside the stator poles, a ferromagnetic yoke mounted adjacent said auxiliary magnet to form a substantially closed magnetic path for the magnet flux, said auxiliary magnet and yoke being positioned relative to said rotor segments to bring said rotor to rest in the de-energized condition of the stator winding so that the magnetic induction of at least one of said rotor segments makes an angle of at least 5 degrees relative to the field axis of said stator pole pair.

15. A synchronous motor comprising a ferromagnetic stator having at least one pair of spaced poles, at least one stator winding mounted thereon, a permanent magnet rotor divided axially into three transversely magnetized cylindrical segments, the first of said segments being axially disposed between two outer segments and transversely magnetized at an angle of approximately 90 degrees relative to said two outer segments, the length of each of said outer segments being approximately half the length of said first segment, and a rotatable shaft supporting said rotor for rotation between said stator poles.

16. A motor as described in claim 15 wherein said three segments are axially contiguous to form an integral cylindrical rotor and wherein the two outer segments are magnetized in the same direction.

17. A motor as described in claim 15 further comprising an auxiliary magnet adjacent the periphery of the rotor and offset relative to the field axis of said stator poles by an angle of at least 5 degrees.

18. A motor as described in claim 15 wherein said rotor shaft extends outside of the stator poles, an auxiliary magnet mounted on a portion of said shaft extending outside the stator poles, a ferromagnetic yoke mounted adjacent said auxiliary magnet to form a substantially closed magnetic path for the magnet flux, said auxiliary magnet and yoke being positioned relative to said rotor segments to bring said rotor to rest in the de-energized condition of the stator winding so that the magnetic induction of at least one of said rotor segments makes an angle of at least 5 degrees relative to the field axis of said stator pole pair.

19. A motor as described in claim 18 wherein said yoke is angularly adjustable.

20. A motor as described in claim 15 further comprising means for applying a sinusoidal AC current to said stator winding that is independent of the rotor position.

References Cited
UNITED STATES PATENTS 2,574,997   11/1951   Askren _____ 310—46
2,791,704   5/1957   Kiralfy _____ 310—1

DAVID X. SLINEY, *Primary Examiner.*

U.S. Cl. X.R.

310—162